United States Patent
Liu et al.

(10) Patent No.: US 12,457,917 B2
(45) Date of Patent: Nov. 4, 2025

(54) CROP YIELD ESTIMATION METHOD AND SYSTEM BASED ON GRADE IDENTIFICATION AND WEIGHT DECISION-MAKING

(71) Applicant: Zhejiang University, Hangzhou (CN)

(72) Inventors: Fei Liu, Hangzhou (CN); Rui Yang, Hangzhou (CN); Jun Zhou, Hangzhou (CN); Xiangyu Lu, Hangzhou (CN); Riqun Ni, Hangzhou (CN); Mengyuan Chen, Hangzhou (CN); Jie Jiao, Hangzhou (CN)

(73) Assignee: Zhejiang University, Hangzhou (CN)

( * ) Notice: Subject to any disclaimer, the term of this patent is extended or adjusted under 35 U.S.C. 154(b) by 430 days.

(21) Appl. No.: 17/994,898

(22) Filed: Nov. 28, 2022

(65) Prior Publication Data
US 2024/0057505 A1    Feb. 22, 2024

(30) Foreign Application Priority Data
Aug. 18, 2022    (CN) .......................... 202210989755.3

(51) Int. Cl.
*A01B 79/00*    (2006.01)
*G06N 3/0464*    (2023.01)
(Continued)

(52) U.S. Cl.
CPC .......... *A01B 79/005* (2013.01); *G06T 7/0012* (2013.01); *G06V 10/82* (2022.01);
(Continued)

(58) Field of Classification Search
CPC ................ A01B 79/005; G06T 7/0012; G06T 2207/20081; G06T 2207/20084;
(Continued)

(56) References Cited

U.S. PATENT DOCUMENTS

2019/0311170 A1 * 10/2019 Aldor-Noiman .... G06F 18/2135
2020/0196516 A1 *  6/2020 Kowald ................. G06Q 50/02
(Continued)

FOREIGN PATENT DOCUMENTS

| CN | 109816542 A | * | 5/2019 | |
| CN | 112541383 B | * | 12/2021 | ............. G01C 21/20 |
| KR | 20210126320 A | * | 10/2021 | |

OTHER PUBLICATIONS

Khairunniza-Bejo et al. (Application of Artificial Neural Network in Predicting Crop Yield: a Review, Journal of Food Science and Engineering 4 (2014) 1-9, Jan. 20, 2014) (Year: 2014).*

(Continued)

*Primary Examiner* — Lisa M Caputo
*Assistant Examiner* — Christian T Bryant
(74) *Attorney, Agent, or Firm* — Patrick M. Torre; Stites & Harbison PLLC

(57) ABSTRACT

The present disclosure provides a crop yield estimation method and system based on level identification and weighted decision fusion. The method includes: inputting an obtained visible light image of a target crop field at maturity into a yield level classification model, to obtain yield level output values corresponding to all yield levels of the visible light image of the target crop field at maturity, where the yield levels are determined according to a yield level rule; calculating a confidence score corresponding to each of the yield level output values, and sorting the confidence scores in descending order; selecting the first m confidence scores, and performing normalization on the first m confidence scores to obtain m yield level weights; and respectively multiplying the m yield level weights and corresponding yield levels, and adding up all products, to obtain an estimated yield of the target crop field at maturity.

6 Claims, 4 Drawing Sheets

(51) Int. Cl.

| | |
|---|---|
| *G06Q 10/04* | (2023.01) |
| *G06Q 50/02* | (2024.01) |
| *G06T 7/00* | (2017.01) |
| *G06T 9/00* | (2006.01) |
| *G06V 10/40* | (2022.01) |
| *G06V 10/764* | (2022.01) |
| *G06V 10/774* | (2022.01) |
| *G06V 10/80* | (2022.01) |
| *G06V 10/82* | (2022.01) |
| *G06V 20/10* | (2022.01) |
| *G06V 20/13* | (2022.01) |
| *G06V 40/16* | (2022.01) |

(52) U.S. Cl.
CPC ......... *G06V 20/188* (2022.01); *G06N 3/0464* (2023.01); *G06Q 10/04* (2013.01); *G06Q 50/02* (2013.01); *G06T 9/002* (2013.01); *G06T 2207/20081* (2013.01); *G06T 2207/20084* (2013.01); *G06T 2207/30188* (2013.01); *G06V 10/40* (2022.01); *G06V 10/764* (2022.01); *G06V 10/774* (2022.01); *G06V 10/80* (2022.01); *G06V 20/13* (2022.01); *G06V 40/172* (2022.01)

(58) Field of Classification Search
CPC .......... G06T 2207/30188; G06T 9/002; G06V 10/82; G06V 20/188; G06V 10/764; G06V 10/774; G06V 10/80; G06V 10/40; G06V 40/172; G06V 20/13; G06Q 10/04; G06Q 50/02; G06N 3/0464
See application file for complete search history.

(56) References Cited

U.S. PATENT DOCUMENTS

| | | | | |
|---|---|---|---|---|
| 2020/0337232 | A1* | 10/2020 | Blank | A01M 7/0089 |
| 2020/0364629 | A1* | 11/2020 | Koob | G06Q 10/04 |
| 2022/0237414 | A1* | 7/2022 | Zhang | A01M 21/00 |
| 2023/0316555 | A1* | 10/2023 | Spangenberg | G06V 10/82 |
| | | | | 345/419 |

OTHER PUBLICATIONS

Hall (The Normal Distribution, Confidence Intervals, and Their Deceptive Simplicity, The Startup, Medium, Aug. 15, 2020) (Year: 2020).*

Fish et al. (A Confidence-Based Approach for Balancing Fairness and Accuracy. In Proceedings of the 2016 SIAM International Conference on Data Mining, pp. 144â152, 2016.) (Year: 2016).*

Yalcin et al. ("An Approximation for a Relative Crop Yield Estimate from Field Images Using Deep Learning," 2019 8th International Conference on Agro-Geoinformatics (Agro-Geoinformatics), Istanbul, Turkey, 2019, pp. 1-6, doi: 10.1109/Agro-Geoinformatics.2019.8820693.) (Year: 2019).*

Wu et al. ( A deep learning fusion model with evidence-based confidence level analysis for differentiation of malignant and benign breast tumors using dynamic contrast enhanced MRI, Biomedical Signal Processing and Control, vol. 72, Part B, Feb. 2022, 103319, ISSN 1746-8094) (Year: 2022).*

* cited by examiner

CROP YIELD ESTIMATION METHOD AND SYSTEM BASED ON GRADE IDENTIFICATION AND WEIGHT DECISION-MAKING

CROSS REFERENCE TO RELATED APPLICATION

This patent application claims the benefit and priority of Chinese Patent Application No. 202210989755.3, filed with the China National Intellectual Property Administration on Aug. 18, 2022, the disclosure of which is incorporated by reference herein in its entirety as part of the present application.

TECHNICAL FIELD

The present disclosure relates to the field of crop yield estimation technologies, an in particular, to a crop yield estimation method and system based on grade identification and weight decision-making.

BACKGROUND

Crop yield estimation is of great significance to food production and security as it helps to grasp crop production status in time and guides decisions about agricultural production. A conventional crop yield estimation method usually refers to a field sampling survey method. After sampling, an estimated yield is calculated according to an empirical formula. This method has a large error and is time-consuming and labor-intensive.

With the development of unmanned aerial vehicle (UAV) remote sensing technology, an operation process of an existing crop yield estimation method is as follows: firstly using an unmanned aerial vehicle to acquire multispectral/hyperspectral images of crop field areas; extracting a plurality of vegetation indexes based on the multispectral/hyperspectral images; then performing regression modeling based on the plurality of extracted vegetation indexes; and finally, predicting a crop yield by using an established model. The processing of unmanned aerial vehicle images in this method is complicated. In addition, a mean absolute percentage error of a yield result predicted by a current good model is still high and needs to be improved.

SUMMARY

An objective of the present disclosure is to provide a crop yield estimation method and system based on grade identification and weight decision-making, to accurately and quickly predict a yield of a crop field at maturity.

To achieve the above objective, the present disclosure provides the following technical solutions:

According to a first aspect, a crop yield estimation method based on grade identification and weight decision-making, including:
obtaining a visible light image of a target crop field at maturity;
inputting the visible light image of the target crop field at maturity into a yield grade classification model, to obtain yield grade output values corresponding to all yield grades of the visible light image of the target crop field at maturity, where the yield grades are determined according to a yield grade rule, the yield grade rule is that a difference between adjacent yield grades is not greater than a set percentage of an average value of all known sample crop yields, and the number of yield grades is not less than a set number;
performing normalization on each of the yield grade output values to obtain a confidence score corresponding to each of the yield grade output values, and sorting the confidence scores in descending order;
selecting, from the confidence scores sorted in descending order, the first m confidence scores, and performing normalization on the first m confidence scores to obtain m yield grade weights; and
respectively multiplying the m yield grade weights and corresponding yield grades, and adding up all products, to obtain an estimated yield of the target crop field at maturity, where
the yield grade classification model is obtained by training a deep convolutional neural network based on sample data, the sample data includes sample input data and corresponding label data, the sample input data is an image of a sample crop field at maturity, and the label data is a yield grade of the image of the sample crop field at maturity.

Optionally, the sample data is determined in the following process:
acquiring visible light sequence photos of a plurality of sample crop fields at maturity with known crop yields and of a certain height not higher than a set value by using a remote sensing device, transmitting the visible light sequence photos of the sample crop fields at maturity to a computer, and storing the visible light sequence photos on the computer in a form of visible light sequence images;
stitching and orthorectifying the visible light sequence images based on image features, to obtain preprocessed visible light sequence images, where the image features at least include photo heading overlap features and side overlap features;
clipping, based on different crop yields and a boundary of the sample crop fields at maturity, the preprocessed visible light sequence images, to obtain images, corresponding to different known crop yields, of an initial sample crop field at maturity;
determining, based on the yield grade rule and the crop yields corresponding to the images of the initial sample crop field at maturity, yield grades of the images of the initial sample crop field at maturity;
performing random sampling for equal size and no repetition on the images of the initial sample crop field at maturity with different known yield grades, to obtain images of the sample crop fields at maturity after sampling and corresponding yield grades; and
performing data format conversion, normalization, and label assignment on the images of the sample crop fields at maturity after sampling and the corresponding yield grades, to obtain final images of the sample crop fields at maturity after sampling and corresponding label data.

Optionally, the yield grade rule is that: the difference between adjacent yield grades is not greater than 10% of the average value of all known sample crop yields, and the number of yield grades is not less than 10.

Optionally, the inputting the visible light image of the target crop field at maturity into a yield grade classification model, to obtain yield grade output values corresponding to all yield grades of the visible light image of the target crop field at maturity specifically includes:
stitching and orthorectifying the visible light image of the target crop field at maturity based on image features, to obtain preprocessed visible light images, where the image features at least include photo heading overlap features and side overlap features;

clipping, based on a boundary of the target crop field at maturity, the preprocessed visible light image, to obtain a plurality of images of an initial target crop field at maturity;

performing random sampling for equal size and no repetition on the plurality of images of the initial target crop field at maturity, to obtain images of the target crop field at maturity after sampling;

performing data format conversion on each of the images of the target crop field at maturity after sampling, to obtain a plurality of images of the target crop field at maturity after data format conversion; and inputting each of the images of the target crop field at maturity after data format conversion into the yield grade classification model, to obtain yield grade output values corresponding to all yield grades of each image of the target crop field at maturity after data format conversion.

Optionally, the performing normalization on each of the yield grade output values to obtain a confidence score corresponding to each of the yield grade output values, and sorting the confidence scores in descending order specifically includes:

performing a first operation on each of the images of the target crop field at maturity after data format conversion, where the first operation is: normalizing each of the yield grade output values corresponding to the images of the target crop field at maturity after data format conversion, to obtain a confidence score corresponding to each of the yield grade output values, and sorting the confidence scores corresponding to the images of the target crop field at maturity after data format conversion in descending order.

Optionally, the selecting, from the confidence scores sorted in descending order, the first m confidence scores, and performing normalization on the first m confidence scores to obtain m yield grade weights specifically includes:

performing a second operation on each of the images of the target crop field at maturity after data format conversion, where the second operation is: selecting the first m confidence scores from a sorting-in-descending-order set corresponding to the images of the target crop field at maturity after data format conversion, and performing normalization on the first m confidence scores to obtain m yield grade weights corresponding to the images of the target crop field at maturity after data format conversion; and the sorting-in-descending-order set includes confidence scores sorted in descending order.

Optionally, the respectively multiplying the m yield grade weights and corresponding yield grades, and adding up all products, to obtain an estimated yield of the target crop field at maturity specifically includes:

performing a third operation on each of the images of the target crop field at maturity after data format conversion, where the third operation is: respectively multiplying the m yield grade weights corresponding to the images of the target crop field at maturity after data format conversion and the yield grades corresponding to the m yield grade weights, and adding up all products, to obtain an estimated yield of a field corresponding to the images of the target crop field at maturity after data format conversion.

According to a second aspect, the present disclosure provides a crop yield estimation system based on grade identification and weight decision-making, including:

a module for obtaining a visible light image of a target field, configured to obtain a visible light image of a target crop field at maturity;

a module for determining yield grade output values of the target field, configured to input the visible light image of the target crop field at maturity into a yield grade classification model, to obtain yield grade output values corresponding to all yield grades of the visible light image of the target crop field at maturity, where the yield grades are determined according to a yield grade rule, the yield grade rule is that a difference between adjacent yield grades is not greater than a set percentage of an average value of all known sample crop yields, and the number of yield grades is not less than a set number;

a confidence score sorting module, configured to: perform normalization on each of the yield grade output values to obtain a confidence score corresponding to each of the yield grade output values, and sort the confidence scores in descending order;

a yield grade weight calculation module, configured to: select, from the confidence scores sorted in descending order, the first m confidence scores, and perform normalization on the first m confidence scores to obtain m yield grade weights; and a target field yield estimation module, configured to: respectively multiply the m yield grade weights and corresponding yield grades, and add up all products, to obtain an estimated yield of the target crop field at maturity, where the yield grade classification model is obtained by training a deep convolutional neural network based on sample data, the sample data includes sample input data and corresponding label data, the sample input data is an image of a sample crop field at maturity, and the label data is a yield grade of the image of the sample crop field at maturity.

Optionally, the yield grade rule is that: the difference between adjacent yield grades is not greater than 10% of the average value of all known sample crop yields, and the number of yield grades is not less than 10.

According to the specific embodiments provided by the present disclosure, the present disclosure discloses the following technical effects:

The present disclosure provides a crop yield estimation method and system based on grade identification and weight decision-making. The present disclosure uses a deep convolutional neural network to classify yield grades of the visible light image of the target crop field at maturity, to obtain yield grade output values corresponding to all yield grades of the visible light image of the target crop field at maturity. Then normalization is performed on the yield grade output values to select m yield grade weights. The m yield grade weights and the corresponding yield grades are multiplied respectively, and all products are added up to obtain an estimated yield of the target crop field at maturity. The present disclosure provides a simple estimation method in which crop yield estimation can be implemented based on a simple visible light image, without manually extracting image features. It is verified in practical production that, a mean absolute error between each of all estimated yields and an actual yield is not more than 550 kg/ha, and a mean absolute percentage error is not more than 5%, which has a strong production application value.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

To make the above-mentioned objective, features, and advantages of the present disclosure clearer and more comprehensible, the present disclosure will be further described in detail below in conjunction with the accompanying drawings and specific embodiments.

Embodiment 1

Figure 1:
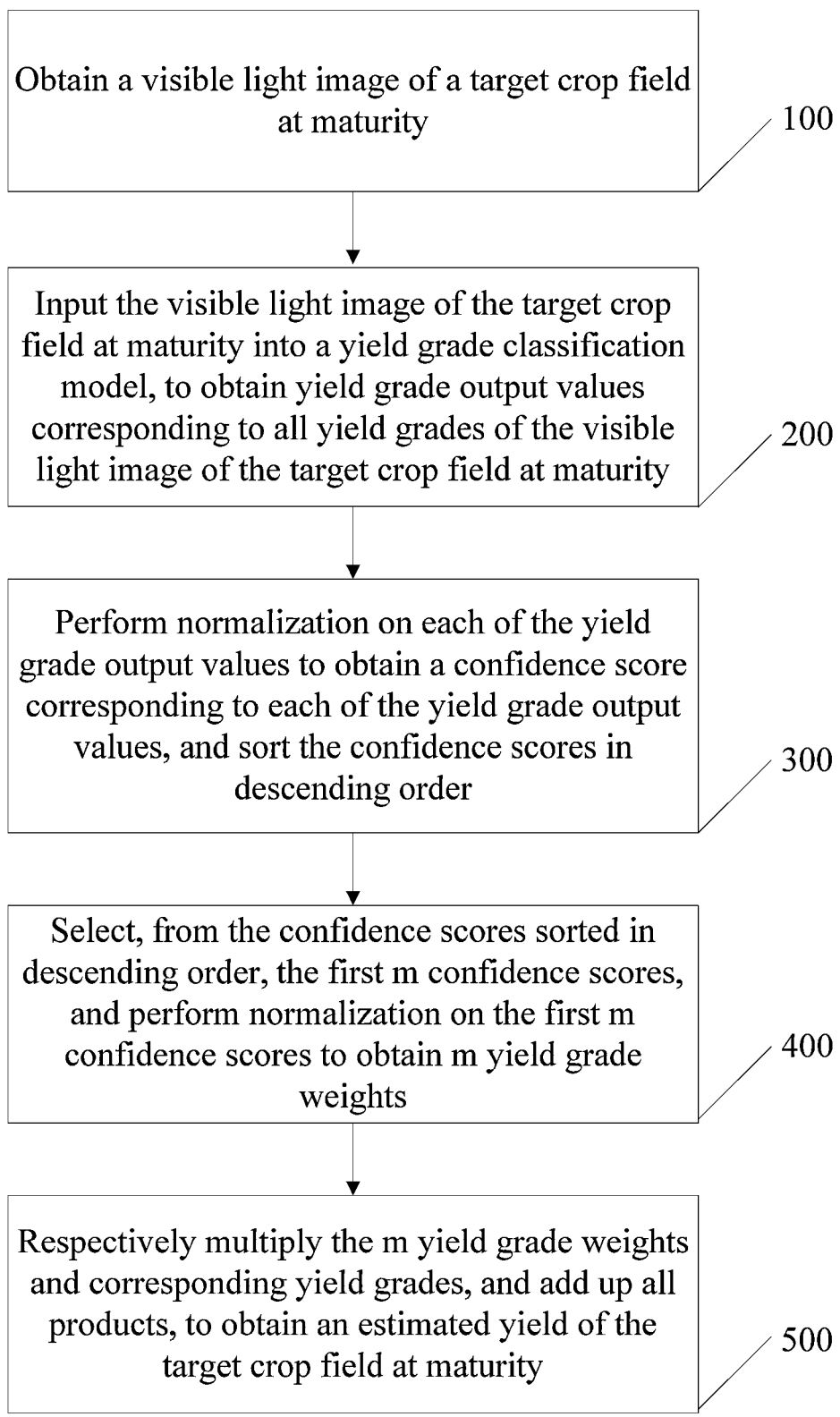
FIG. 1 is a schematic flowchart of a crop yield estimation method based on grade identification and weight decision-making according to Embodiment 1 of the present disclosure.
Figure 2:
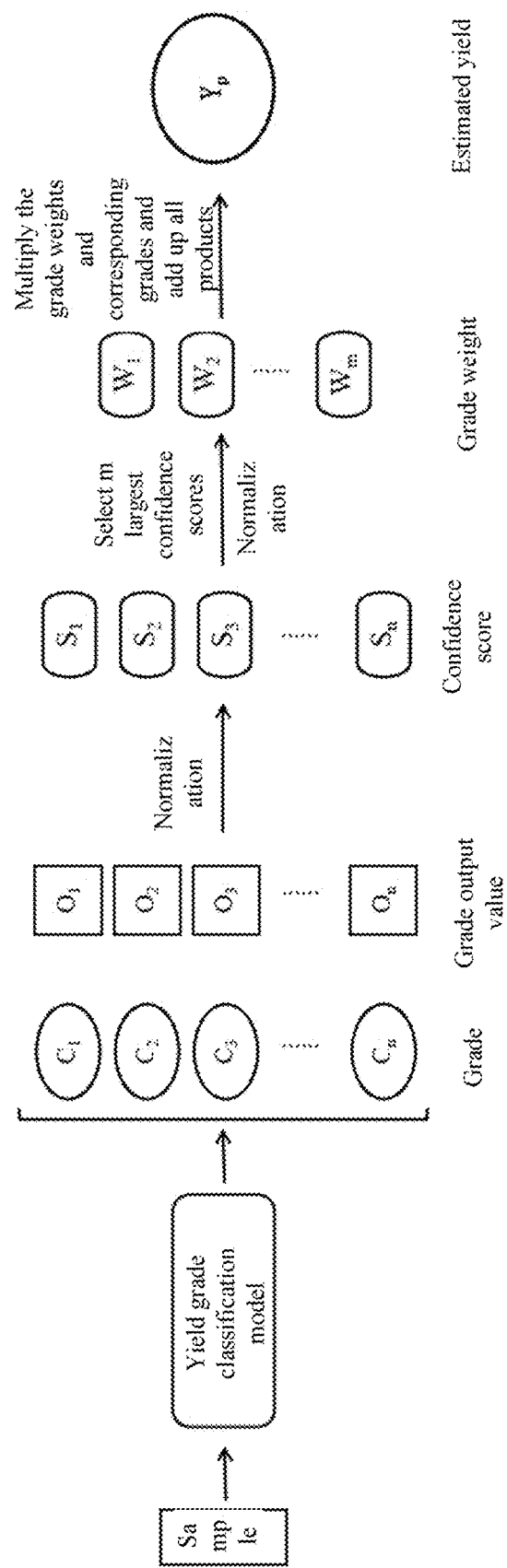
FIG. 2 is a specific flowchart of a crop yield estimation method based on grade identification and weight decision-making according to Embodiment 1 of the present disclosure.

As shown in FIG. 1 and FIG. 2, an embodiment of the present disclosure provides a crop yield estimation method based on grade identification and weight decision-making, which specifically includes the following steps:

Step 100: Obtain a visible light image of a target crop field at maturity.

Step 200: Input the visible light image of the target crop field at maturity into a yield grade classification model, to obtain yield grade output values corresponding to all yield grades of the visible light image of the target crop field at maturity, where the yield grades are determined according to a yield grade rule, the yield grade rule is that a difference between adjacent yield grades is not greater than a set percentage of an average value of all known sample crop yields, and the number of yield grades is not less than a set number.

Step 300: Perform normalization on each of the yield grade output values to obtain a confidence score corresponding to each of the yield grade output values, and sort the confidence scores in descending order.

Step 400: Select, from the confidence scores sorted in descending order, the first m confidence scores, and perform normalization on the first m confidence scores to obtain m yield grade weights.

Step 500: Respectively multiply the m yield grade weights and corresponding yield grades, and add up all products, to obtain an estimated yield of the target crop field at maturity. The estimated yield here is a unit yield.

the yield grade classification model is obtained by training a deep convolutional neural network based on sample data, the sample data includes sample input data and corresponding label data, the sample input data is an image of a sample crop field at maturity, and the label data is a yield grade of the image of the sample crop field at maturity.

The sample data is determined in the following process:

Step 1: Acquire complete visible light sequence photos of a plurality of sample crop fields at maturity with known crop yields and a certain height not higher than a set value (for example, 100 m) by using a remote sensing device, for example, an unmanned aerial vehicle; transmitting the complete visible light sequence photos to a computer; and storing the complete visible light sequence photos on the computer in a form of visible light sequence images. The visible light sequence photos are processed on the computer in a form of image data.

Step 2: The computer stitches and orthorectifies the visible light sequence images based on image features such as photo heading overlap features and side overlap features, to obtain preprocessed visible light sequence images; and clips, based on different crop yields and a boundary of the sample crop fields at maturity, the preprocessed visible light sequence images, to obtain images, corresponding to different known crop yields, of an initial sample crop field at maturity.

Step 3: Determine, based on the yield grade rule and the crop yields corresponding to the images of the initial sample crop field at maturity, yield grades of the images of the initial sample crop field at maturity. The yield grade rule here is that: the difference between adjacent yield grades is not greater than 10% of the average value of all known sample crop yields, and the number of yield grades is not less than 10.

Step 4: Perform random sampling for equal size and no repetition on the images of the initial sample crop field at maturity with different known yield grades, to obtain images of the sample crop fields at maturity after sampling and corresponding yield grades. The images of the sample crop fields at maturity after sampling are sample images each with a size not less than 224×224, and the number of sample images in each yield grade is not less than 100.

Random sampling: This operation refers to randomly clipping or selecting non-repetitive images with the same size (for example, 224×224) on/from the images of the sample crop fields at maturity with a known yield, as input data in a deep convolutional neural network subsequently.

The reason for random sampling is that the images of the sample crop fields at maturity have different sizes, and sample data input into the deep convolutional neural network needs to be of a uniform size. Here uses an example of the images of the sample crop fields at maturity with a known yield: The same-size and non-repetitive sampling is performed on the images of the sample crop fields at maturity, and several sample images are obtained, where these sample images have the same label value, namely, a yield grade corresponding to an actual yield of the sample crop field at maturity.

Step 5: Perform data format conversion, normalization, label assignment, etc. on the images of the sample crop fields at maturity after sampling and the corresponding yield grades, to obtain final images of the sample crop fields at maturity after sampling and corresponding label data. The above processed image is a multi-dimensional data matrix.

For example, tensor data format conversion, normalization, label data correspondence, etc. are performed on the foregoing data through the ImageFolder function, to obtain final images of the sample crop fields at maturity after sampling and corresponding label data. The label data is a yield grade corresponding to sample input data.

A training process of the yield grade classification model is as follows:

Step A: Build a yield grade classification network.

Step B: Train the yield grade classification network by using sample data, to obtain the yield grade classification model.

Further, step B specifically includes:

Step B1: Divide the sample data into a training set, a validation set, and a test set according to a certain ratio, for example, 6:2:2.

Step B2: Divide sample data in the training set into no less than 8 batches, which are input into the deep convolutional neural network by batch to extract image features, to obtain yield grades of all the sample data in the training set after classification.

In this process, the deep convolutional neural network outputs yield grade output values corresponding to the yield grades, and selects a yield grade corresponding to the largest yield grade output value as a predicted result corresponding to the sample data, namely, a yield grade corresponding to the sample data.

Step B3: Calculate average loss values of label data corresponding to all sample data in the training set and yield grades corresponding to all the sample data in the training set through the nn.CrossEntropyLoss ( ) function, and feed back the average loss values to the yield grade classification network for further optimization of model parameters, thus completing one time of training process of the yield grade classification model.

The training process is performed not less than 50 times. The yield grade classification network after each time of training performs performance validation on the validation set until an accuracy rate of yield grade classification by the trained yield grade classification network on the validation set tends to be flat, and the accuracy rate of yield grade classification is not less than 80%. In this case, all parameters of the yield grade classification network after the training are stored to build the yield grade classification model according to this embodiment of the present disclosure based on all the parameters.

A preferred implementation of step 200 specifically includes:

Step 201: Stitch and orthorectify the visible light image of the target crop field at maturity based on image features, to obtain preprocessed visible light images, where the image features at least include photo heading overlap features and side overlap features.

Step 202: Clip, based on a boundary of the target crop field at maturity, the preprocessed visible light image, to obtain a plurality of images of an initial target crop field at maturity.

Step 203: Perform random sampling for equal size and no repetition on the plurality of images of the initial target crop field at maturity, to obtain images of the target crop field at maturity after sampling.

Step 204: Perform data format conversion on each of the images of the target crop field at maturity after sampling, to obtain a plurality of images of the target crop field at maturity after data format conversion.

Step 205: Input each of the images of the target crop field at maturity after data format conversion into the yield grade classification model, to obtain yield grade output values corresponding to all yield grades of each image of the target crop field at maturity after data format conversion.

A preferred implementation of step 300 specifically includes:

performing a first operation on each of the images of the target crop field at maturity after data format conversion.

The first operation is: normalizing each of the yield grade output values corresponding to the images of the target crop field at maturity after data format conversion, to obtain a confidence score corresponding to each of the yield grade output values, and sorting the confidence scores corresponding to the images of the target crop field at maturity after data format conversion in descending order.

A preferred implementation of step 400 specifically includes:

performing a second operation on each of the images of the target crop field at maturity after data format conversion.

The second operation is: selecting the first m confidence scores from a sorting-in-descending-order set corresponding to the images of the target crop field at maturity after data format conversion, and performing normalization on the first m confidence scores to obtain m yield grade weights corresponding to the images of the target crop field at maturity after data format conversion; and the sorting-in-descending-order set includes confidence scores sorted in descending order.

A preferred implementation of step 500 specifically includes:

performing a third operation on each of the images of the target crop field at maturity after data format conversion.

The third operation is: respectively multiplying the m yield grade weights corresponding to the images of the target crop field at maturity after data format conversion and the yield grades corresponding to the m yield grade weights, and adding up all products, to obtain an estimated yield of a field corresponding to the images of the target crop field at maturity after data format conversion.

In an example, the yield grade classification model is used to perform yield grade classification on the sample data in the test set, to obtain yield grade output values corresponding to all sample data. After the yield grade classification, normalization is performed on yield grade output values, namely, O1, O2, O3, . . . , and On, that are of all sample data and that are output from the yield grade classification model. For example, the Softmax normalization function is used to convert O1, O2, O3, . . . , and On into the confidence score values that the yield grade classification model judges whether the sample belongs to each output grade value, namely, S1, S2, S3, ..., Si, ..., and Sn; and a sum of confidence scores of yield grade output values output by the yield grade classification model for one sample is 1. The confidence scores are sorted in descending order, and the first m confidence scores are selected, where m is not less than 3. Normalization is performed on the selected m confidence scores according to formula (1), and yield grade weights of the sample, namely, W1, W2, W3, ..., Wi, ..., and Wm are obtained, where a sum of the yield grade weights is 1.

$$W_i = \frac{S_i}{\sum_{i=1}^{m} S_i} \quad (1)$$

For the obtained yield grade weights corresponding to sample data in the test set, and yield grades corresponding to the yield grade weights, according to formula (2), the yield grade weights and the corresponding yield grades are multiplied respectively and all products are added up, to obtain an estimated yield Yp of a crop field at maturity corresponding to the sample data. For all sample data in the test set, corresponding estimated yields are obtained according to this method.

$$Y_p = \Sigma_{i=1}^{m} W_i C_i \quad (2), \text{where}$$

$C_i$ represents a yield grade corresponding to the ith yield grade weight.

It is indicated after comparison that, a mean absolute error between each of all obtained estimated yields and an actual yield is not more than 550 kg/ha, and a mean absolute percentage error is not more than 5%.

Embodiment 2

Here uses rice as an example to describe a crop yield estimation method based on yield grade identification and weight decision-making protected by the present disclosure.

This embodiment of the present disclosure provides a rice yield estimation method based on yield grade identification and weight decision-making. The method includes the following steps:

Step 1: Set a forward overlap rate of an unmanned aerial vehicle to 60%, a side overlap rate of the unmanned aerial vehicle to 55%, a flight speed of the unmanned aerial vehicle to 2.5 m/s, and a flight height of the unmanned aerial vehicle to 25 m. The unmanned aerial vehicle with configured parameters is used to acquire several complete visible light images of a rice field at maturity. An actual yield of the rice field at maturity ranges from 3654.2 kg/ha to 16978.5 kg/ha. A model of the unmanned aerial vehicle is DJI Mavic2.

Step 2: Stitch and orthorectify the visible light images based on features such as photo heading overlap features and side overlap features, and clip out images of rice fields at maturity with different crop yields, to obtain 131 images of rice fields at maturity with known crop yields.

Step 3: Set a difference between adjacent yield grades to 900 kg/ha, and set a total of 16 yield grades: 36500 kg/ha, 45500 kg/ha, 54500 kg/ha, 63500 kg/ha, 72500 kg/ha, 81500 kg/ha, 90500 kg/ha, 99500 kg/ha, 108500 kg/ha, 117500 kg/ha, 126500 kg/ha, 135500 kg/ha, 144500 kg/ha, 153500 kg/ha, 162500 kg/ha, and 17250 kg/ha. A fluctuation value (for example, the fluctuation value is 450 kg/ha) is set on the basis of each of the yield grades. After the fluctuation value is set, the yield grades are used to perform yield grade classification on the 131 images of rice fields at maturity with known crop yields. For example, a yield of 3200-4100 kg/ha of rice belongs to the 3650 kg/ha yield grade. Further, random non-repetitive sampling of 224×224 size is performed on images of rice fields at maturity at each yield grade, and 600 pieces of sample data are obtained for each yield grade.

Step 4: Divide all sample data into training data, validation data, and test data according to the ratio of 6:2:2, and complete tensor format conversion, normalization, label assignment, etc. on all sample data based on open source functions such as ImageFolder and DataLoader in the computer programming language: Python, thus forming a training set, a validation set, and a test set of a yield grade classification model. A Pytorch framework is used to build the yield grade classification model. In this embodiment, the published ShuffleNet V2 pre-training model is used, and an output dimension of a fully-connected layer is set to the number of 16 of yield grades. The nn.CrossEntropyLoss function is used to calculate loss in a training process of the yield grade classification model; the torch.optim.Adam function is used as an optimizer; the number of epoch operations is set as 50; a batch size parameter is set as 64; and a learning rate is set as 0.005. On this basis, the test set and the validation set are input into the model to start to iteratively train the yield grade classification model. After 40 epochs, the loss value of the yield grade classification model in the validation set is stable. In a training process of 50 epochs, an optimal accuracy rate of the training set is 98.5%, an optimal accuracy rate of the validation set is 87.5%, and an optimal accuracy rate of the test set is 87.3%. In this case, model parameters that achieve the optimal accuracy rates are stored.

Step 5: Invoke the yield grade classification model trained in step 4, and use the yield grade classification model to perform yield grade classification on samples in the test set, to obtain yield grade output values of sample data in the test set. A yield grade output value O of each piece of sample data in the test set is normalized by the Softmax normalization function, and converted into a confidence score. The Softmax normalization function is used to convert O1, O2, O3, ..., and On into the confidence score values that the yield grade classification model judges whether the sample belongs to each output grade value, namely, S1, S2, S3, ..., Si, ..., and Sn; and a sum of confidence scores of yield grade output values output by the yield grade classification model for one sample is 1. The three largest confidence scores are selected, and normalization is performed on the three confidence scores to obtain yield grade weights, where a sum of the three yield grade weights is 1. The three yield grade weights and corresponding yield grades are multiplied respectively, and all products are added up to obtain an estimated yield of a rice field corresponding to the sample.

Figure 3:
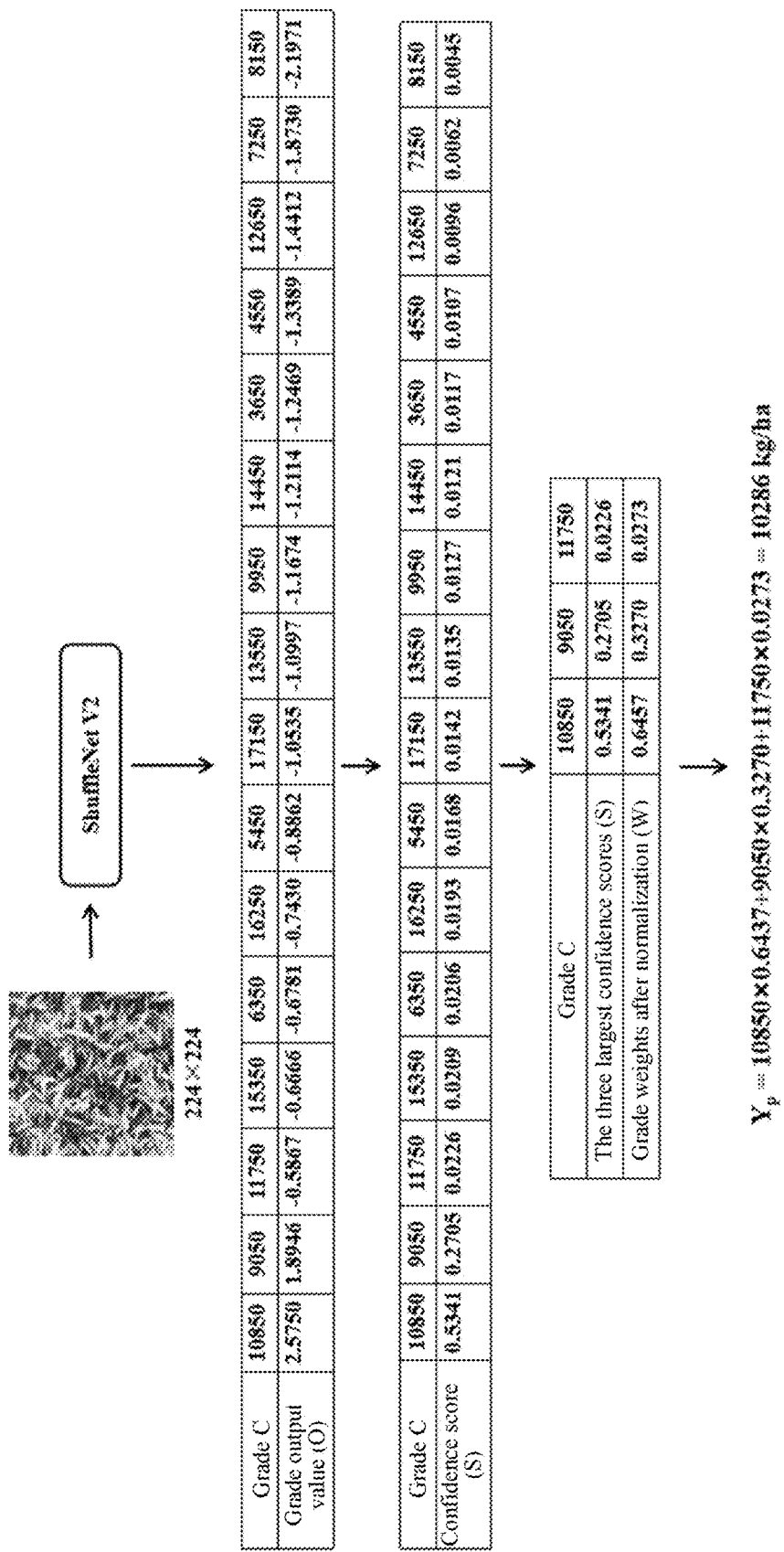
FIG. 3 is an example diagram of weighted decision according to Embodiment 2 of the present disclosure.

A sample with a yield of 10850 kg/ha that is identified by preliminary yield grade identification is used as an example:

As shown in FIG. 3, the sample is input into the ShuffleNet V2 model trained in step 4, and a yield grade output value O corresponding to a yield grade C is obtained; and the yield grade output value O is converted into a confidence score S through the Softmax normalization function. The three largest confidence scores are selected. The three confidence scores are multiplied separately by a reciprocal (namely, 1.209) of a sum of the three confidence scores. Then, normalization is performed so that the sum of the three confidence scores is 1, to obtain three yield grade weights W of the sample. The three yield grade weights are multiplied by corresponding yield grades, and all products are added up to obtain an estimated yield of a rice field corresponding to the sample.

Step 6: According to the foregoing steps, estimate yields of all samples in the test set. A mean absolute error between each of the estimated yields and an actual value is 402.13 kg/ha, and a mean absolute percentage error is 3.87%.

Embodiment 3

To implement the method corresponding to Embodiment 1 to achieve corresponding functions and technical effects, the following provides a crop yield estimation system based on yield grade identification and weight decision-making.

Figure 4:
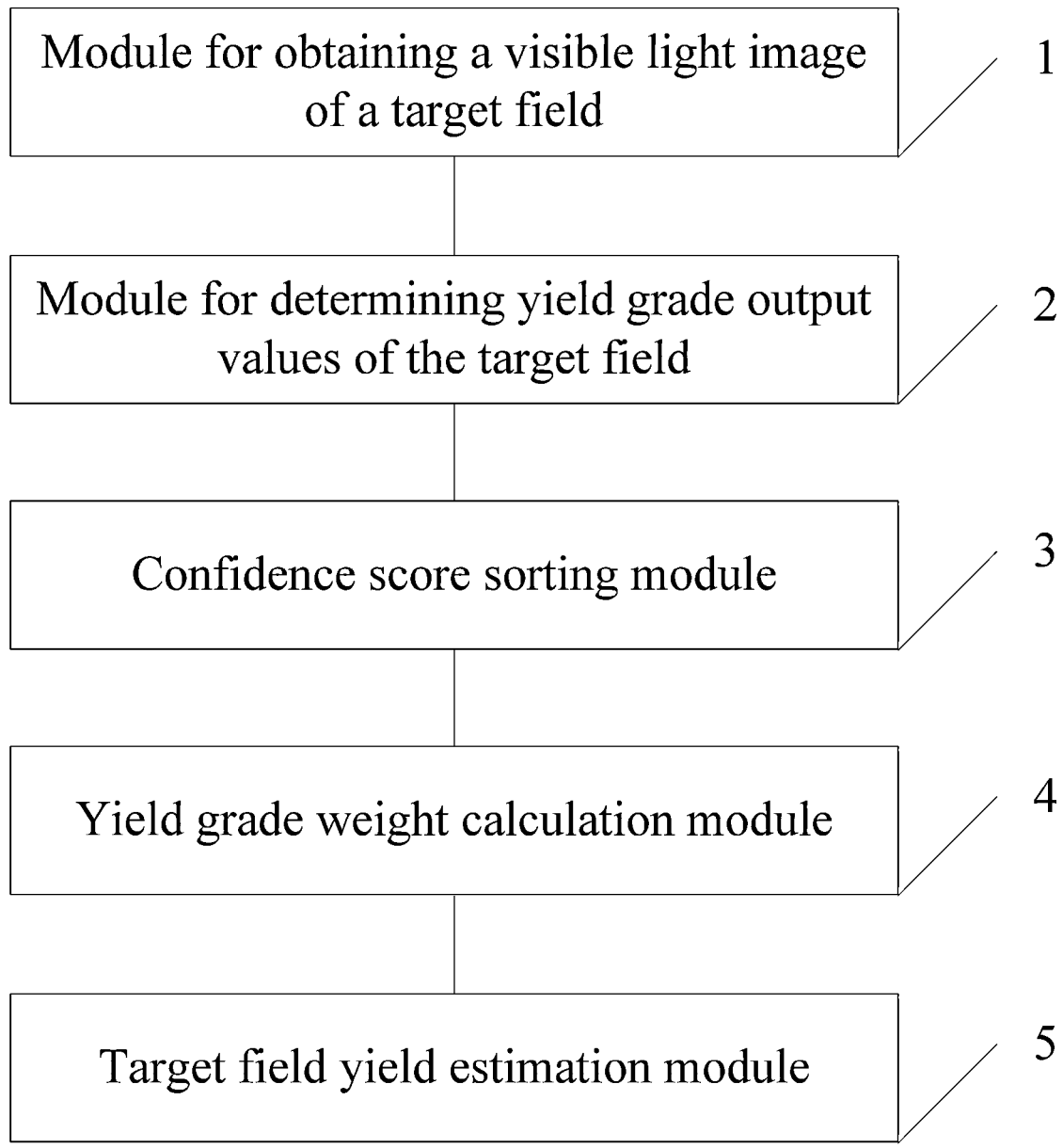
FIG. 4 is a schematic diagram of a structure of a crop yield estimation system based on grade identification and weight decision-making according to Embodiment 3 of the present disclosure.

As shown in FIG. 4, an embodiment of the present disclosure provides a crop yield estimation system based on grade identification and weight decision-making, which specifically includes:

a module 1 for obtaining a visible light image of a target field, configured to obtain a visible light image of a target crop field at maturity;

a module 2 for determining yield grade output values of the target field, configured to input the visible light image of the target crop field at maturity into a yield grade classification model, to obtain yield grade output values corresponding to all yield grades of the visible light image of the target crop field at maturity, where the yield grades are determined according to a yield grade rule, the yield grade rule is that a difference between adjacent yield grades is not greater than a set percentage of an average value of all known sample crop yields, and the number of yield grades is not less than a set number;

a confidence score sorting module 3, configured to: perform normalization on each of the yield grade output values to obtain a confidence score corresponding to each of the yield grade output values, and sort the confidence scores in descending order;

a yield grade weight calculation module 4, configured to: select, from the confidence scores sorted in descending order, the first m confidence scores, and perform normalization on the first m confidence scores to obtain m yield grade weights; and a target field yield estimation module 5, configured to: respectively multiply the m yield grade weights and corresponding yield grades, and add up all products, to obtain an estimated yield of the target crop field at maturity.

The yield grade classification model is obtained by training a deep convolutional neural network based on sample data, the sample data includes sample input data and corresponding label data, the sample input data is an image of a sample crop field at maturity, and the label data is a yield grade of the image of the sample crop field at maturity.

Further, the yield grade rule is that: the difference between adjacent yield grades is not greater than 10% of the average value of all known sample crop yields, and the number of yield grades is not less than 10.

Each embodiment of the present specification is described in a progressive manner, each example focuses on the difference from other examples, and the same and similar parts between the examples may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A crop yield estimation method based on grade identification and weight decision-making, comprising:
   acquiring a visible light image of a target crop field at maturity by using a remote sensing device;
   inputting the visible light image of the target crop field at maturity into a yield grade classification model, to obtain yield grade output values corresponding to all yield grades of the visible light image of the target crop field at maturity, wherein the yield grades are determined according to a yield grade rule, the yield grade rule is that a difference between adjacent yield grades is not greater than a product of a predetermined percentage and an average value of all known sample crop yields, and the number of yield grades is not less than a set number;
   performing normalization on each of the yield grade output values to obtain a confidence score corresponding to each of the yield grade output values, and sorting the confidence scores in descending order;
   selecting, from the confidence scores sorted in descending order, a first m confidence scores, and performing normalization on the first m confidence scores to obtain m yield grade weights wherein m is a predetermined positive integer not less than 3; and
   respectively multiplying the m yield grade weights and corresponding yield grades, and adding up all products, to obtain an estimated yield of the target crop field at maturity, wherein:
   the yield grade classification model is obtained by training a deep convolutional neural network based on sample data, the sample data comprises sample input data and corresponding label data, the sample input data is an image of a sample crop field at maturity, and the label data is a yield grade of the image of the sample crop field at maturity;
   wherein the inputting the visible light image of the target crop field at maturity into the yield grade classification model, to obtain yield grade output values corresponding to all yield grades of the visible light image of the target crop field at maturity comprises:
   stitching and orthorectifying the visible light image of the target crop field at maturity based on image features, to obtain preprocessed visible light images, wherein the image features at least comprise photo heading overlap features and side overlap features;
   clipping, based on a boundary of the target crop field at maturity, the preprocessed visible light image, to obtain a plurality of images of an initial target crop field at maturity;
   performing random sampling for equal size and no repetition on the plurality of images of the initial target crop field at maturity, to obtain images of the target crop field at maturity after sampling;

performing data format conversion on each of the images of the target crop field at maturity after sampling, to obtain a plurality of images of the target crop field at maturity after data format conversion; and inputting each of the images of the target crop field at maturity after data format conversion into the yield grade classification model, to obtain yield grade output values corresponding to all yield grades of each image of the target crop field at maturity after data format conversion.

2. The crop yield estimation method based on grade identification and weight decision-making according to claim 1, wherein the sample data is determined in the following process:

acquiring visible light sequence photos of a plurality of sample crop fields at maturity with known crop yields and of a certain height not higher than a set value by using the remote sensing device, transmitting the visible light sequence photos of the sample crop fields at maturity to a computer, and storing the visible light sequence photos on the computer in a form of visible light sequence images;

stitching and orthorectifying the visible light sequence images based on image features, to obtain preprocessed visible light sequence images, wherein the image features at least comprise photo heading overlap features and side overlap features;

clipping, based on different known crop yields and a boundary of the sample crop fields at maturity, the preprocessed visible light sequence images, to obtain images, corresponding to different known crop yields, of an initial sample crop field at maturity;

determining, based on the yield grade rule and the crop yields corresponding to the images of the initial sample crop field at maturity, yield grades of the images of the initial sample crop field at maturity;

performing random sampling for equal size and no repetition on the images of the initial sample crop field at maturity with different known yield grades, to obtain images of the sample crop fields at maturity after sampling and corresponding yield grades; and performing data format conversion, normalization, and label assignment on the images of the sample crop fields at maturity after sampling and the corresponding yield grades, to obtain final images of the sample crop fields at maturity after sampling and corresponding label data.

3. The crop yield estimation method based on grade identification and weight decision-making according to claim 1, wherein the performing normalization on each of the yield grade output values to obtain a confidence score corresponding to each of the yield grade output values, and sorting the confidence scores in descending order specifically comprises:

performing a first operation on each of the images of the target crop field at maturity after data format conversion, wherein the first operation is: normalizing each of the yield grade output values corresponding to the images of the target crop field at maturity after data format conversion, to obtain a confidence score corresponding to each of the yield grade output values, and sorting the confidence scores corresponding to the images of the target crop field at maturity after data format conversion in descending order.

4. The crop yield estimation method based on grade identification and weight decision-making according to claim 3, wherein the selecting, from the confidence scores sorted in descending order, the first m confidence scores, and performing normalization on the first m confidence scores to obtain m yield grade weights specifically comprises:

performing a second operation on each of the images of the target crop field at maturity after data format conversion, wherein:

the second operation is: selecting the first m confidence scores from a sorting-in-descending-order set corresponding to the images of the target crop field at maturity after data format conversion, and performing normalization on the first m confidence scores to obtain m yield grade weights corresponding to the images of the target crop field at maturity after data format conversion; and the sorting-in-descending-order set comprises confidence scores sorted in descending order.

5. The crop yield estimation method based on grade identification and weight decision-making according to claim 4, wherein the respectively multiplying the m yield grade weights and corresponding yield grades, and adding up all products, to obtain an estimated yield of the target crop field at maturity specifically comprises:

performing a third operation on each of the images of the target crop field at maturity after data format conversion, wherein the third operation is: respectively multiplying the m yield grade weights corresponding to the images of the target crop field at maturity after data format conversion and the yield grades corresponding to the m yield grade weights, and adding up all products, to obtain an estimated yield of a field corresponding to the images of the target crop field at maturity after data format conversion.

6. A crop yield estimation system based on grade identification and weight decision-making, comprising:

an acquiring module, configured to acquire a visible light image of a target crop field at maturity by using a remote sensing device;

a determining module, configured to input the visible light image of the target crop field at maturity into a yield grade classification model, to obtain yield grade output values corresponding to all yield grades of the visible light image of the target crop field at maturity, wherein the yield grades are determined according to a yield grade rule, the yield grade rule is that a difference between adjacent yield grades is not greater than a product of a predetermined percentage and an average value of all known sample crop yields, and the number of yield grades is not less than a set number;

a confidence score sorting module, configured to: perform normalization on each of the yield grade output values to obtain a confidence score corresponding to each of the yield grade output values, and sort the confidence scores in descending order;

a yield grade weight calculation module, configured to: select, from the confidence scores sorted in descending order, a first m confidence scores, and perform normalization on the first m confidence scores to obtain m yield grade weights; wherein m is a predetermined positive integer not less than 3; and a target field yield estimation module, configured to: respectively multiply the m yield grade weights and corresponding yield grades, and add up all products, to obtain an estimated yield of the target crop field at maturity, wherein:

the yield grade classification model is obtained by training a deep convolutional neural network based on sample data, the sample data comprises sample input data and corresponding label data, the sample input data is an image of a sample crop field at maturity, and the label data is a yield grade of the image of the sample crop field at maturity;

wherein inputting the visible light image of the target crop field at maturity into a yield grade classification model, to obtain yield grade output values corresponding to all yield grades of the visible light image of the target crop field at maturity comprises:

stitching and orthorectifying the visible light image of the target crop field at maturity based on image features, to obtain preprocessed visible light images, wherein the image features at least comprise photo heading overlap features and side overlap features;

clipping, based on a boundary of the target crop field at maturity, the preprocessed visible light image, to obtain a plurality of images of an initial target crop field at maturity; performing random sampling for equal size and no repetition on the plurality of images of the initial target crop field at maturity, to obtain images of the target crop field at maturity after sampling;

performing data format conversion on each of the images of the target crop field at maturity after sampling, to obtain a plurality of images of the target crop field at maturity after data format conversion; and inputting each of the images of the target crop field at maturity after data format conversion into the yield grade classification model, to obtain yield grade output values corresponding to all yield grades of each image of the target crop field at maturity after data format conversion.

\* \* \* \* \*